(12) United States Patent
Sashida et al.

(10) Patent No.: US 11,992,996 B2
(45) Date of Patent: May 28, 2024

(54) METHOD FOR MANUFACTURING HIGH-PRESSURE TANK

(71) Applicant: HONDA MOTOR CO., LTD., Tokyo (JP)

(72) Inventors: Masahiro Sashida, Wako (JP); Masanori Hori, Wako (JP); Kohei Kawashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/830,662

(22) Filed: Jun. 2, 2022

(65) Prior Publication Data

US 2022/0388224 A1 Dec. 8, 2022

(30) Foreign Application Priority Data

Jun. 7, 2021 (JP) .................... 2021-095399

(51) Int. Cl.
*B29C 70/34* (2006.01)
*B29C 53/56* (2006.01)
*B29C 53/80* (2006.01)
*B29C 70/54* (2006.01)
*B29L 31/00* (2006.01)

(52) U.S. Cl.
CPC .......... *B29C 53/562* (2013.01); *B29C 53/564* (2013.01); *B29C 53/8091* (2013.01); *B29C 70/347* (2013.01); *B29C 70/545* (2013.01); *B29L 2031/7156* (2013.01)

(58) Field of Classification Search
CPC .................................................. B29C 70/347
See application file for complete search history.

(56) References Cited

U.S. PATENT DOCUMENTS

| 7,451,795 B2 * | 11/2008 | Weg | B29C 53/8091 |
| | | | 156/425 |
| 7,832,235 B2 * | 11/2010 | Neubert | B29C 53/828 |
| | | | 65/432 |
| 2008/0251620 A1 * | 10/2008 | Neubert | B29C 53/8091 |
| | | | 242/570 |

FOREIGN PATENT DOCUMENTS

JP 2021-014019 A 2/2021

\* cited by examiner

*Primary Examiner* — Jeffry H Aftergut
(74) *Attorney, Agent, or Firm* — Carrier, Shende & Associates P.C.; Joseph P. Carrier; Jeffrey T. Gedeon (57) ABSTRACT

In a method for manufacturing a high-pressure tank, a fiber bundle impregnated with a thermosetting resin base material is wound around an outer surface of a liner in a state where tension is applied to the fiber bundle in a filament winding step. The filament winding step includes a pressure-bonding step and a cutting step. In the pressure-bonding step, a terminal end portion which is a winding end of the fiber bundle is thermocompression-bonded to an outer peripheral portion of the fiber bundle wound around the liner. In the cutting step, a surplus portion of the fiber bundle is cut by a cutting tool.

5 Claims, 9 Drawing Sheets

METHOD FOR MANUFACTURING HIGH-PRESSURE TANK

CROSS-REFERENCE TO RELATED APPLICATIONS

This application is based upon and claims the benefit of priority from Japanese Patent Application No. 2021-095399 filed on Jun. 7, 2021, the contents of which are incorporated herein by reference.

BACKGROUND OF THE INVENTION

Field of the Invention

The present invention relates to a method for manufacturing a high-pressure tank in which a fiber bundle is wound around an outer peripheral surface of a liner.

Description of the Related Art

The high-pressure tank is formed in a cylindrical shape. The high-pressure tank is formed to be capable of being filled with high-pressure gas such as hydrogen gas. The high-pressure tank disclosed in JP 2021-014019 A includes a liner, a reinforcing layer, and a cap. The liner has a space to be filled with high-pressure gas. A fiber bundle impregnated with resin is wound around the liner, whereby the reinforcing layer reinforces the liner. The cap is joined to the liner and has a flow path through which the gas can flow.

When such a high-pressure tank is manufactured, a protective layer is formed by winding a fiber bundle, which is impregnated with a thermosetting resin, a plurality of times around the outer peripheral surface of the liner in a state where a predetermined tension is applied. When winding of the fiber bundle around the outer peripheral surface of the liner is completed, the fiber bundle is cut in a cutting step. Thereafter, the terminal end portion of the cut fiber bundle is attached to an outermost peripheral portion of the fiber bundle that has been already wound around the liner. The attached terminal end portion of the fiber bundle is heated by a heater and fixed to the outermost peripheral portion in a fixing step. Thereafter, the thermosetting resin impregnated in the fiber bundle wound around the liner is thermally cured in a thermal curing step to form the protective layer.

SUMMARY OF THE INVENTION

However, in the above-described method for manufacturing a high-pressure tank, after the fiber bundle is cut at the position of the terminal end portion in the cutting step, the terminal end portion is heated and fixed to the outermost peripheral portion of the fiber bundle that has been already wound around the liner. Therefore, the terminal end portion of the fiber bundle cannot be fixed to the outermost peripheral portion in a state where tension is applied to the vicinity of the terminal end portion of the fiber bundle. As a result, when the protective layer is formed by thermally curing the fiber bundle, winding disorder due to looseness occurs over the entire fiber bundle in which tension is not maintained, including the terminal end portion. As a result, the strength of the protective layer (reinforcing layer) is lowered, or the outer peripheral surface of the protective layer is formed in an uneven shape, thereby deteriorating the design property.

According to an aspect of the present invention, provided is a method for manufacturing a high-pressure tank including a reinforcing layer on an outer surface of a liner having a hollow shape, the method comprising: winding a fiber bundle impregnated with a thermosetting resin around the outer surface of the liner in a state where tension is applied to the fiber bundle; and forming the reinforcing layer by thermally curing the thermosetting resin contained in the fiber bundle wound around the outer surface, wherein the winding of the fiber bundle includes: pressure-bonding a terminal end portion serving as a winding end of the fiber bundle, to an outer peripheral portion of the fiber bundle wound around the liner; and cutting, with a cutting tool, a surplus portion of the fiber bundle that is close to the terminal end portion and is not wound around the liner.

In the pressure-bonding, the terminal end portion of the fiber bundle is thermocompression-bonded to the outer peripheral portion of the fiber bundle that has been already wound around the outer surface of the liner. As a result, the outer peripheral surface of the reinforcing layer obtained by winding the fiber bundle a plurality of times is not formed in an uneven shape. Further, after the terminal end portion is fixed in the pressure-bonding, the surplus portion of the fiber bundle close to the terminal end portion is cut by the cutting tool.

As a result, the outer peripheral surface of the high-pressure tank can be formed to be smooth to improve the quality. In addition, the fiber bundle can be wound around and fixed to the outer surface of the liner in a state where tension is applied to the entire region from the winding start to the winding end (terminal end portion) of the fiber bundle. Therefore, the strength of the reinforcing layer is maintained substantially constant over the entire region of the high-pressure tank.

The above and other objects features and advantages of the present invention will become more apparent from the following description when taken in conjunction with the accompanying drawings in which a preferred embodiment of the present invention is shown by way of illustrative example.

DESCRIPTION OF THE INVENTION

Figure 1:
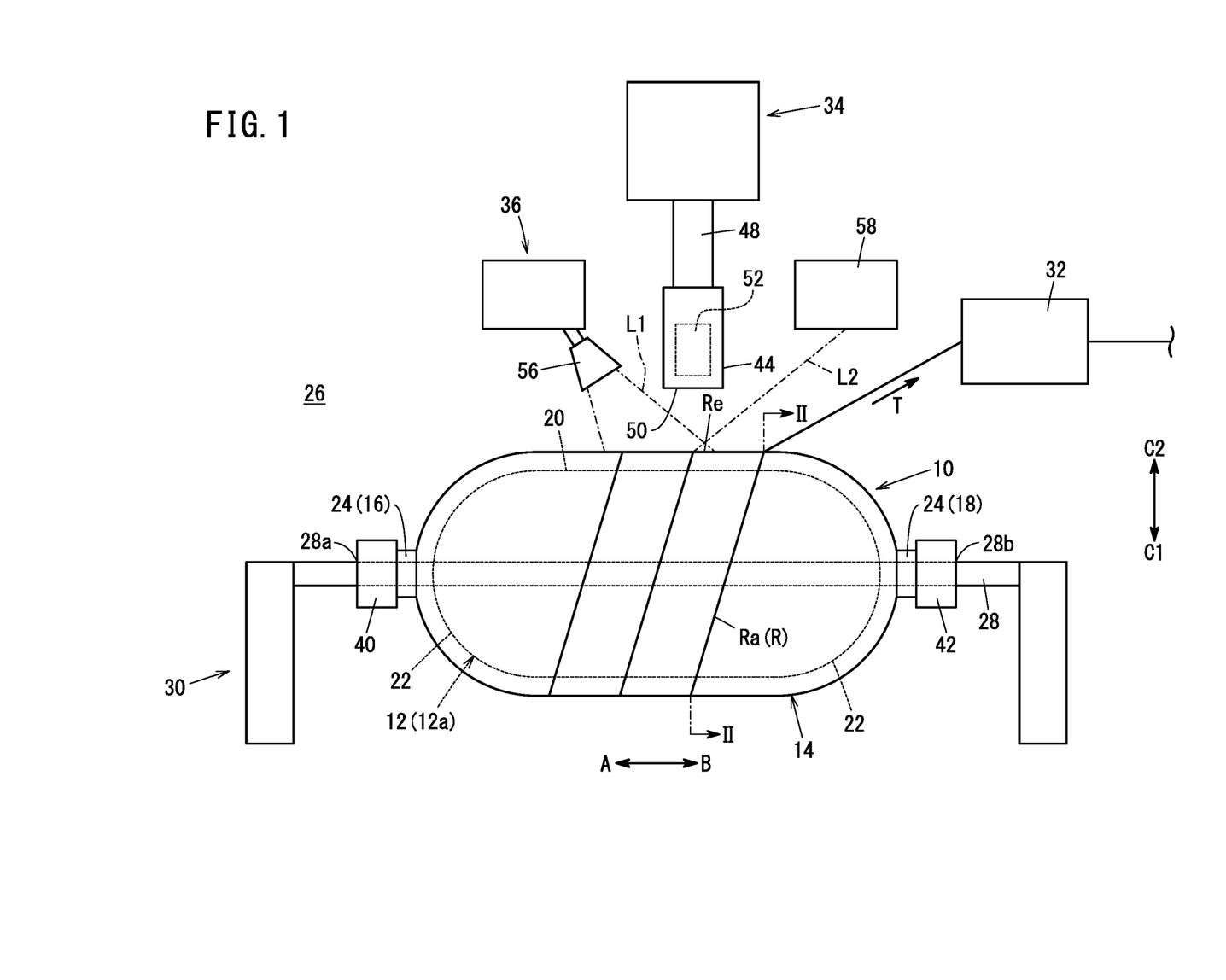
FIG. 1 is a schematic configuration diagram including a manufacturing apparatus for manufacturing a high-pressure tank according to an embodiment of the present invention.
Figure 2:
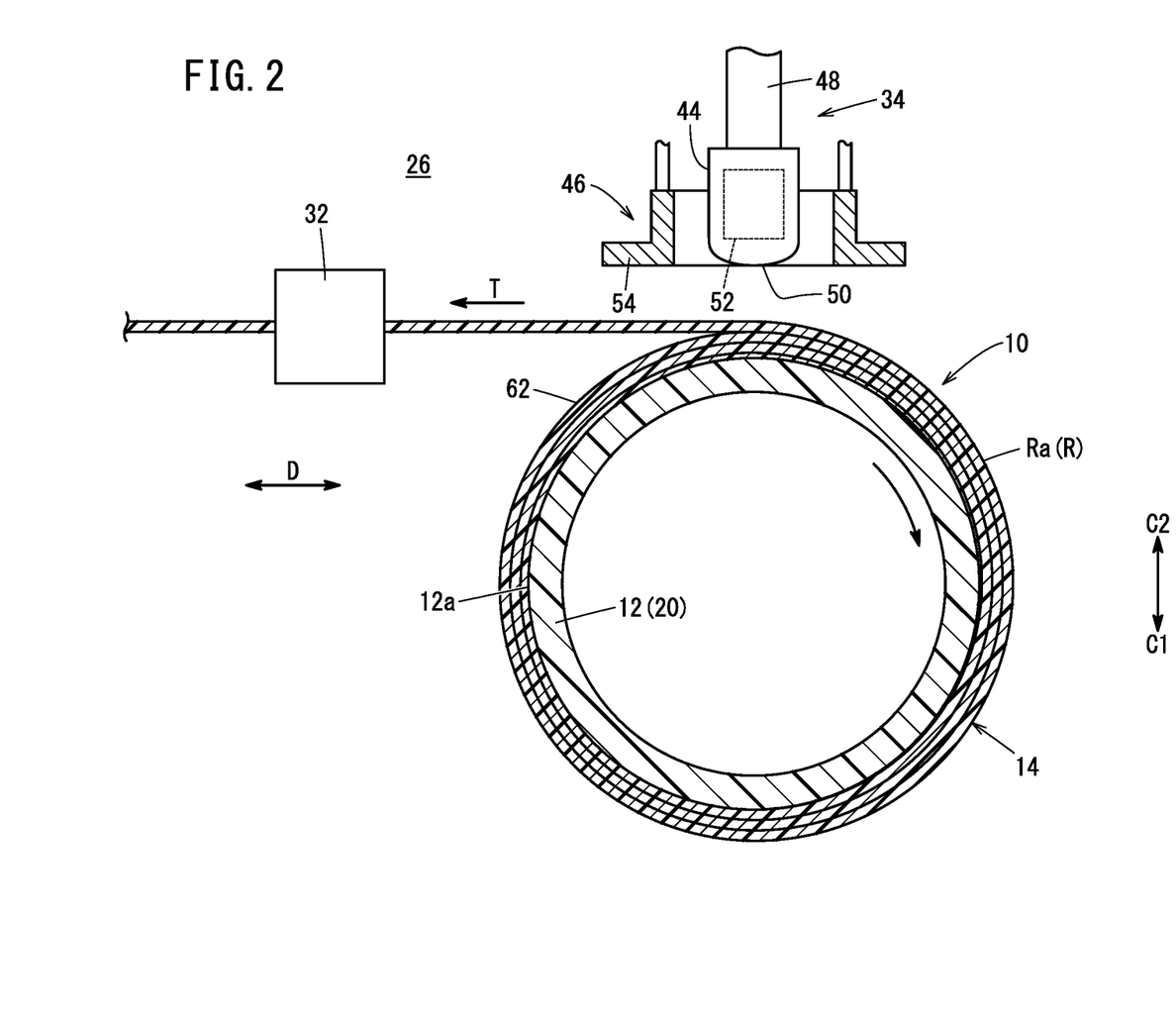
FIG. 2 is a cross-sectional view taken along line II-II of FIG. 1.

A high-pressure tank 10 is mounted on, for example, a fuel cell vehicle, and stores hydrogen gas to be supplied to a fuel cell system. As shown in FIGS. 1 and 2, the high-pressure tank 10 includes a liner 12, a reinforcing layer 14, and first and second caps 16 and 18.

The liner 12 is an inner layer. The liner 12 is, for example, a hollow body formed from a resin material. The liner 12 is configured such that high-pressure gas such as hydrogen gas can be stored therein. The liner 12 includes a cylindrical body portion 20, and substantially hemispherical closing portions 22 that close both ends of the body portion 20. The closing portions 22 are provided at one axial end and the other axial end along the axial direction of the body portion 20 (directions of arrows A and B). Each of the two closing portions 22 is provided with a port portion 24 that allows the inside and the outside of the liner 12 to communicate with each other. The first and second caps 16 and 18 for flowing hydrogen gas are fixed to the two port portions 24, respectively.

The body portion 20 extends linearly along the axial direction of the liner 12 (the directions of arrows A and B). The closing portions 22 are curved radially inward from one axial end and the other axial end of the body portion 20.

The reinforcing layer 14 is formed from, for example, a fiber reinforced resin R in which fibers are impregnated with a resin base material (resin). The reinforcing layer 14 is an outer layer of the high-pressure tank 10. The reinforcing layer 14 covers an entire outer surface 12a of the body portion 20 and the closing portions 22 of the liner 12, a part of the first cap 16, and a part of the second cap 18. Further, the reinforcing layer 14 is wound around the liner 12 as a fiber bundle Ra obtained by bundling a plurality of uncured fiber-reinforced resins R in a filament winding step performed by a manufacturing apparatus 26 described later. Thereafter, the fiber bundle Ra (fiber-reinforced resin R) wound around the liner 12 is cured in a thermal curing step (reinforcing layer forming step), whereby the reinforcing layer 14 is formed.

The first and second caps 16 and 18 are connected to one axial end and the other axial end of the liner 12, respectively. A supply/discharge hole (not shown) is formed in each of the first and second caps 16 and 18.

Next, the manufacturing apparatus 26 for manufacturing the above-described high-pressure tank 10 will be described.

Figure 9:
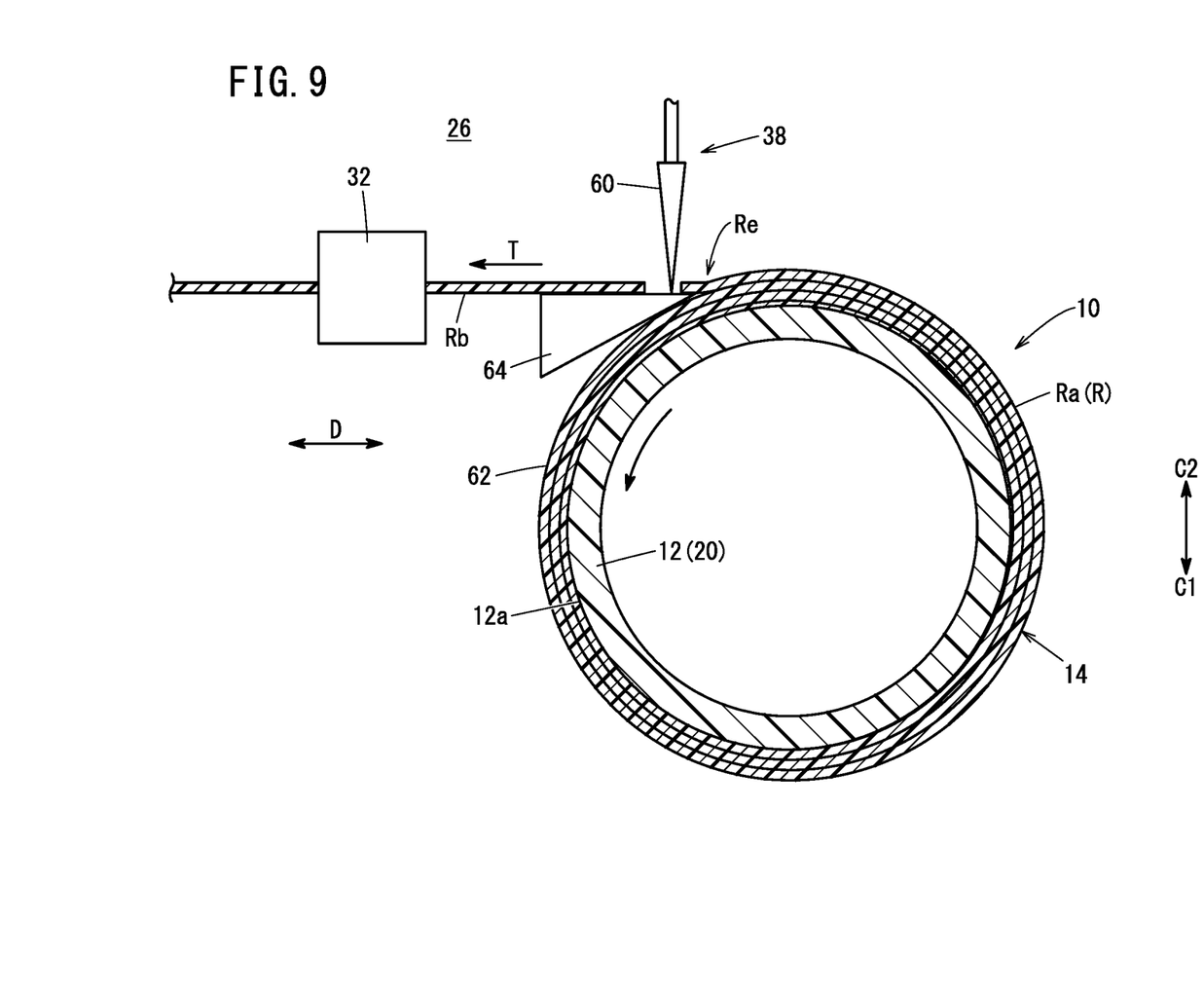
FIG. 9 is a cross-sectional view showing a cutting step in the manufacturing process of the high-pressure tank.

As shown in FIG. 1, the manufacturing apparatus 26 includes a rotating mechanism 30, a feeding mechanism 32, a pressure bonding mechanism 34, a detecting mechanism 36, and a cutting mechanism 38 (see FIG. 9).

A shaft 28 is connected to the rotating mechanism 30. The shaft 28 passes through one axial end and the other axial end of the liner 12 and supports the liner 12. The feeding mechanism 32 feeds the fiber bundle Ra to be wound around the outer surface 12a of the liner 12. The pressure bonding mechanism 34 thermocompression-bonds a terminal end portion Re of the fiber bundle Ra wound around the liner 12, to the reinforcing layer 14. The detecting mechanism 36 detects a fiber direction (an arrow D direction) at the terminal end portion Re.

As shown in FIG. 9, the cutting mechanism 38 cuts a surplus portion Rb of the fiber bundle Ra that is surplus with respect to the terminal end portion Re that is thermocompression-bonded to an outer peripheral portion 62 of the fiber bundle Ra wound around the liner 12.

As shown in FIG. 1, a first end portion 28a provided at one axial end of the shaft 28 includes a first attachment 40 that protrudes from the inside of the liner 12 toward one side in the axial direction (an arrow A direction). The first attachment 40 is fixed to the first cap 16. On the other hand, a second end portion 28b provided at the other axial end of the shaft 28 includes a second attachment 42 that protrudes from the inside of the liner 12 toward the other side in the axial direction (an arrow B direction). The second attachment 42 is fixed to the second cap 18. The first end portion 28a and the second end portion 28b of the shaft 28 are attached to the rotating mechanism 30. The liner 12 is held in a state where an axis of the liner 12 extends in a substantially horizontal direction (the directions of arrows A and B). In this state, the rotating mechanism 30 is driven. This causes the liner 12 to rotate together with the shaft 28.

The feeding mechanism 32 applies a predetermined tension T to the fiber bundle Ra (fiber-reinforced resin R) wound around the rotating liner 12. In this state, the feeding mechanism 32 feeds the fiber bundle Ra in a direction away from the liner 12 (the arrow B direction in FIG. 1).

As shown in FIGS. 1 to 8, the pressure bonding mechanism 34 is provided, for example, on the outer peripheral portion of the body portion 20 of the liner 12. The pressure bonding mechanism 34 is movable in the up-down direction (directions of arrows C1 and C2) so as to approach and separate from the liner 12 by, for example, driving of a cylinder device 48. As shown in FIG. 2, the pressure bonding mechanism 34 includes a pressure bonding member 44, and a pressing member 46.

The pressure bonding member 44 thermocompression-bonds the terminal end portion Re, which is the winding end of the fiber bundle Ra, to the outer peripheral portion 62 of the fiber bundle Ra that has been already wound around the liner 12. The pressing member 46 separates from the pressure bonding member 44 to press the vicinity of the terminal end portion Re toward the liner 12. In other words, the pressure bonding member 44 and the pressing member 46 can advance and retreat in a direction orthogonal to the axis of the liner 12.

The pressure bonding member 44 includes a pressing surface 50 at a distal end thereof in a direction from the pressure bonding member 44 toward the liner 12. The cross section of the pressing surface 50 is formed in an arc shape that is convex toward the liner 12. A heating device 52 such as a heater is accommodated inside the pressure bonding member 44. The distal end of the pressure bonding member 44 is heated by the heating device 52 by energizing the heating device 52.

The pressure bonding member 44 is disposed orthogonally to the outer surface 12a of the liner 12. The pressure bonding member 44 approaches and separates from the liner 12 by driving of the cylinder device 48.

Figure 3:
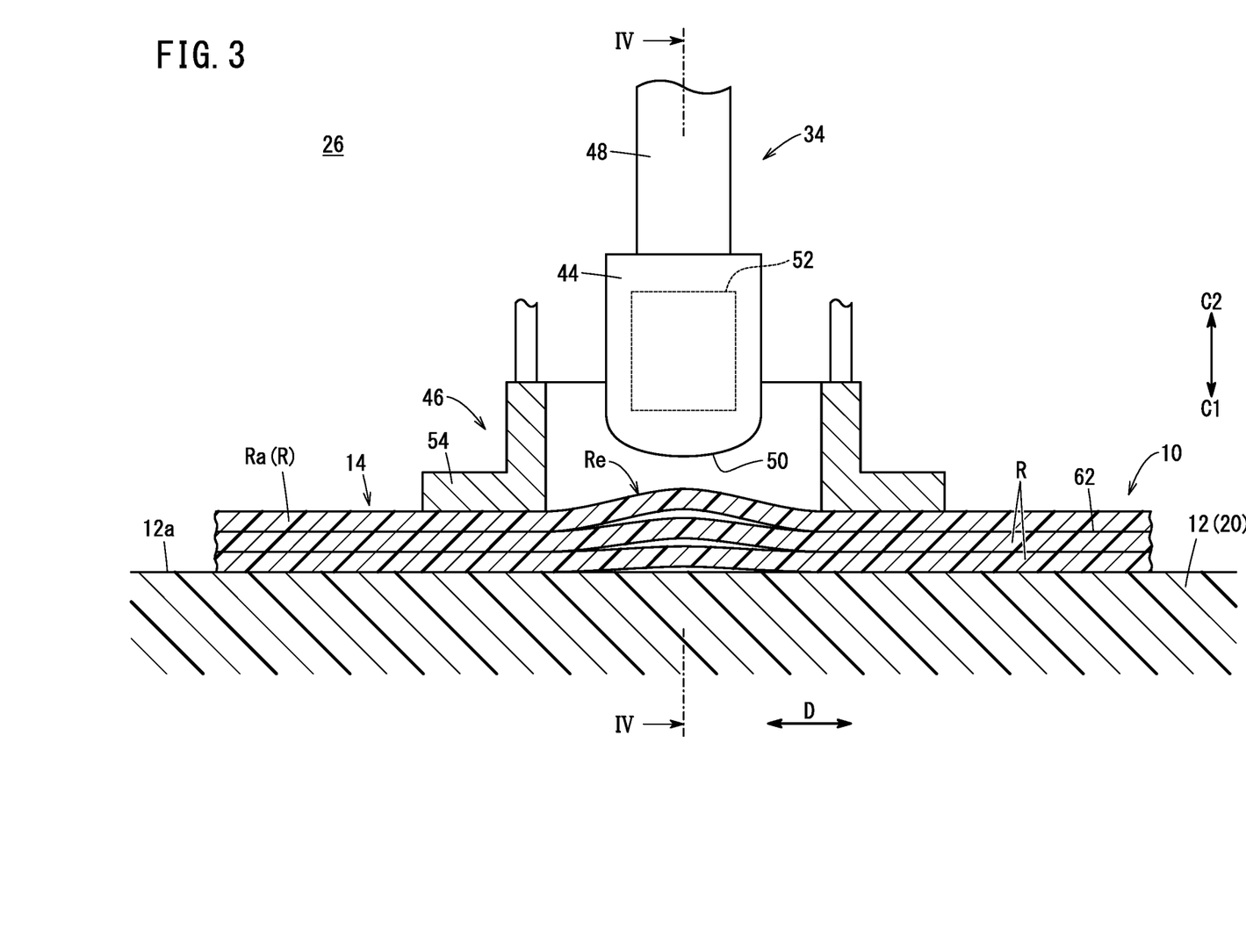
FIG. 3 is an enlarged cross-sectional view showing a pressure bonding mechanism and the vicinity of the terminal end portion of the fiber bundle in FIG. 2.
Figure 4:
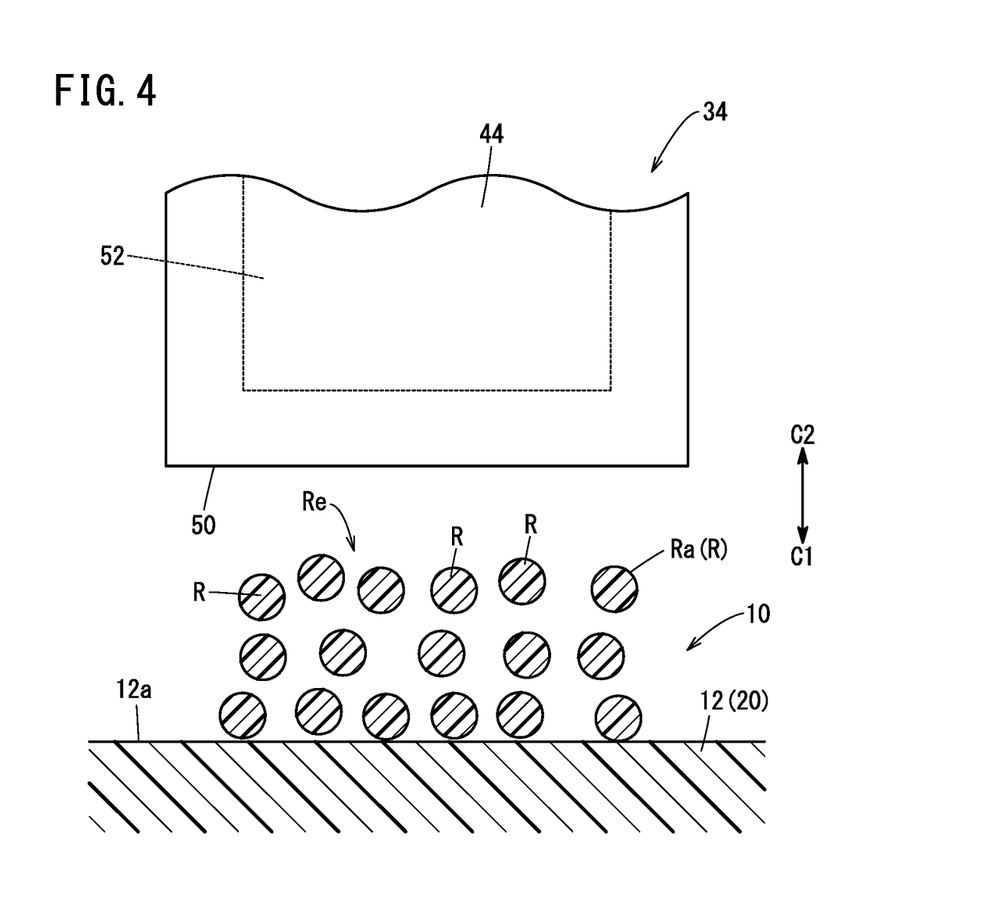
FIG. 4 is a cross-sectional view taken along line IV-IV of FIG. 3.

When the pressure bonding member 44 moves toward the liner 12, the pressing surface 50 of the pressure bonding member 44 comes into contact with the terminal end portion Re of the fiber bundle Ra as shown in FIGS. 5 to 8. Thereafter, the pressure bonding member 44 presses the terminal end portion Re toward the outer peripheral portion 62 of the fiber bundle Ra wound around the liner 12. At the same time, the distal end of the pressure bonding member 44 is heated by the heating device 52. As a result, the terminal end portion Re is thermocompression-bonded to the outer peripheral portion 62 of the fiber bundle Ra wound around the liner 12 by the pressure bonding member 44. At this time, as shown in FIGS. 2 and 3, the pressure bonding member 44 is disposed such that the pressing surface 50 has an arc-shaped cross section when viewed from a direction orthogonal to the fiber direction of the fiber bundle Ra (the arrow D direction).

Figure 6:
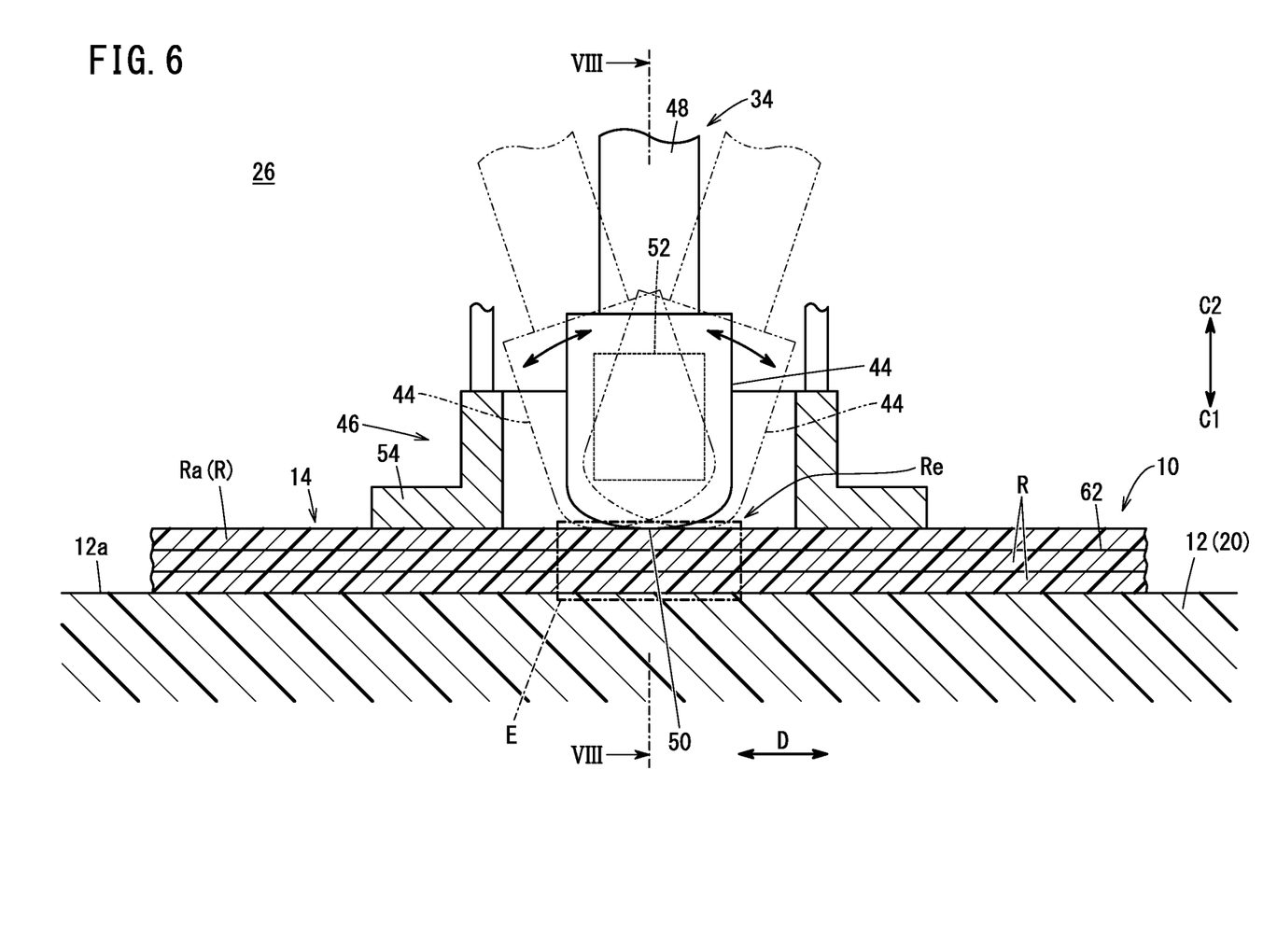
FIG. 6 is an enlarged cross-sectional view showing the pressure bonding mechanism and the vicinity of the terminal end portion of the fiber bundle in FIG. 5.

Further, as shown in FIG. 6, the pressing surface 50 of the distal end of the pressure bonding member 44 comes into contact with the terminal end portion Re of the fiber bundle Ra. In this state, the pressure bonding member 44 can swing with a contact portion between the pressing surface 50 and the terminal end portion Re as a fulcrum.

The pressing member 46 includes an annular holding portion 54 spaced apart from the pressure bonding member 44 in the direction (the arrow D direction) orthogonal to the moving direction of the pressure bonding member 44. In the same manner as the pressure bonding member 44, the pressing member 46 approaches and separates from the liner 12 by driving of the cylinder device 48. The pressing member 46 is movable independently of the pressure bonding member 44.

The holding portion 54 is formed in a substantially flat shape orthogonal to the moving direction of the pressing member 46. The holding portion 54 separates from the pressure bonding member 44 in the direction orthogonal to the moving direction with the pressure bonding member 44 as a center. The holding portion 54 presses the fiber bundle Ra (fiber-reinforced resin R) toward the liner 12.

The detecting mechanism 36 is located outside of the liner 12 as shown in FIG. 1. The detecting mechanism 36 can detect the fiber direction (the arrow D direction) at the terminal end portion Re. The detecting mechanism 36 includes an irradiation unit 56 and a detector 58. The irradiation unit 56 irradiates the terminal end portion Re of the fiber bundle Ra with light L1. When the light L1 is reflected at the terminal end portion Re, reflected light L2 is generated. The detector 58 detects the reflected light L2. Based on the reflected light L2 detected by the detector 58, the fiber direction (the arrow D direction) of the terminal end portion Re of the fiber bundle Ra spirally wound around the outer surface 12a of the liner 12 is determined.

As shown in FIG. 9, the cutting mechanism 38 is disposed on the outer peripheral side of the liner 12. The cutting mechanism 38 can move to the outer peripheral side of the liner 12 by a moving mechanism (not shown). The cutting mechanism 38 includes a cutting tool 60 such as a cutter. The cutting tool 60 is made to approach the liner 12 to cut the surplus portion Rb of the fiber bundle Ra that is in the vicinity of the terminal end portion Re.

Based on the fiber direction (the arrow D direction) of the terminal end portion Re detected by the detecting mechanism 36, the cutting tool 60 of the cutting mechanism 38 moves in the direction orthogonal to this fiber direction.

Next, a case where the high-pressure tank 10 is manufactured by the above-described manufacturing apparatus 26 will be described.

First, in the high-pressure tank 10, the first and second caps 16 and 18 are respectively assembled to the two port portions 24 of the liner 12 as shown in FIG. 1. Then, a filament winding step (winding step) of winding the fiber bundle Ra (fiber-reinforced plastic R) around the outer surface 12a of the liner 12 is performed. As a result, the reinforcing layer 14 is formed on the outer surface 12a of the liner 12.

In this filament winding step, the shaft 28 is set in the first and second attachments 40 and 42 attached to the first and second caps 16 and 18 of the liner 12. Then, the liner 12 is attached to the rotating mechanism 30 such that the shaft 28 is in the horizontal direction. The liner 12 is rotated integrally with the shaft 28 by driving the rotating mechanism 30. Accordingly, the fiber bundle Ra, in which the plurality of fiber-reinforced resins R impregnated with the resin base material are bundled, is wound around the outer surface 12a of the liner 12.

The fiber bundle Ra is spirally wound around the outer surface 12a of the rotating liner 12 by the feeding mechanism 32 at a predetermined inclination angle with respect to the axis of the liner 12. Further, the fiber bundle Ra is wound around the outer surface 12a of the liner 12 in a state of being applied with the predetermined tension T along the fiber direction (the arrow D direction).

Then, the fiber bundle Ra is wound so as to entirely cover the body portion 20 and the two closing portions 22 of the liner 12. Thereafter, the position of the terminal end portion Re, which is the winding end of the fiber bundle Ra, is determined. The fiber direction (the arrow D direction) of the fiber bundle Ra at the terminal end portion Re is detected by the detecting mechanism 36 (detection step).

In this detection step, the light L1 is irradiated from the irradiation unit 56 to the terminal end portion Re of the fiber bundle Ra. The light L1 is reflected at the terminal end portion Re, and the reflected light L2 is generated. Then, the reflected light L2, which is the reflected light L1 irradiated to the terminal end portion Re, is detected by the detector 58. It should be noted that the fiber direction indicates a direction of extension of each fiber-reinforced resin R in the fiber bundle Ra (the arrow D direction in FIGS. 2 and 7). The reflected light L2 is reflected at different angles depending on the fiber direction of the fiber-reinforced resin R at the terminal end portion Re. The fiber direction of the fiber-reinforced resin R at the terminal end portion Re is detected based on the reflected light L2.

Then, the fiber direction (the arrow D direction) of the fiber-reinforced resin R at the terminal end portion Re is detected by the detecting mechanism 36. Thereafter, the terminal end portion Re is thermocompression-bonded to the outer peripheral portion 62 of the fiber bundle Ra that has been already wound around the outer surface 12a of the liner 12 (pressure-bonding step).

In the pressure-bonding step (thermocompression-bonding step), the fiber bundle Ra is wound around the outer surface 12a of the liner 12 with the predetermined tension T by the feeding mechanism 32. In this state, as shown in FIG. 3, first, the pressure bonding member 44 and the pressing member 46 of the pressure bonding mechanism 34 are brought close to the outer peripheral portion 62 of the fiber bundle Ra that has been already wound around the outer surface 12a. The pressure bonding member 44 is heated to a predetermined temperature by energizing the heating device 52.

Figure 7:
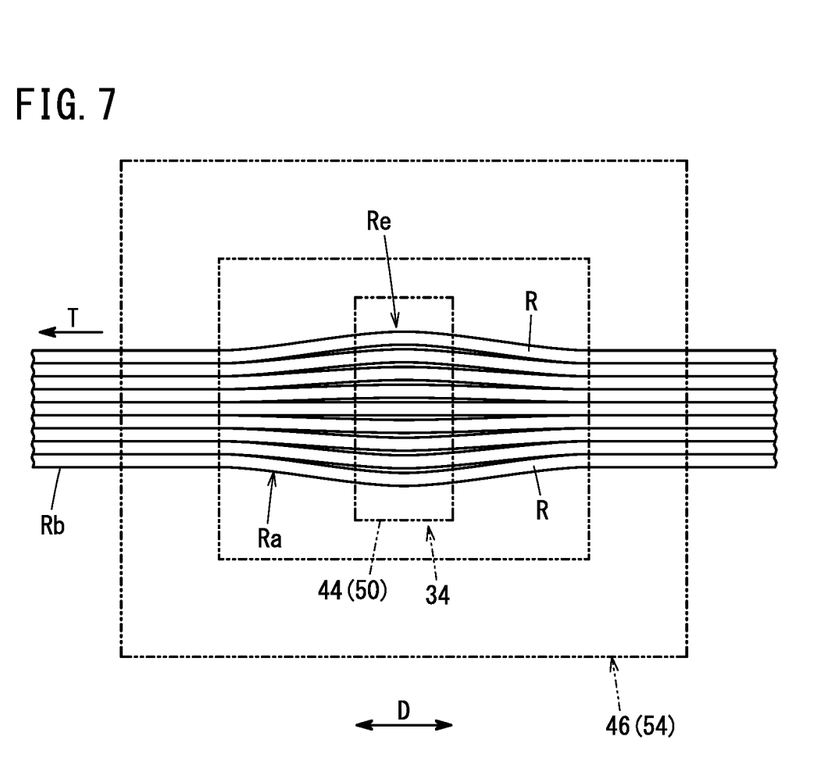
FIG. 7 is an enlarged plan view showing the vicinity of the terminal end portion of the fiber bundle shown in FIG. 6.

Based on the fiber direction (the arrow D direction) of the terminal end portion Re, the pressing member 46 rotates such that the direction of extension of the holding portion 54 becomes substantially parallel to this fiber direction (see FIGS. 3 and 7). At the same time, the pressure bonding member 44 rotates integrally with the pressing member 46. As shown in FIG. 3, the pressing surface 50 of the pressure bonding member 44 is arranged along the fiber direction. Thereafter, as shown in FIG. 3, the pressure bonding member 44 and the pressing member 46 are moved toward the liner 12. Then, the holding portion 54 of the pressing member 46 comes into contact with the surface of the fiber bundle Ra that is in the vicinity of the terminal end portion Re. Specifically, the holding portion 54 holds the front-rear position of the terminal end portion Re that is along the fiber direction (the arrow D direction). In this state, the holding portion 54 of the pressing member 46 presses the terminal end portion Re of the fiber bundle Ra toward the liner 12 to hold the terminal end portion Re.

As a result, the plurality of fiber-reinforced resins R in the fiber bundle Ra are pressed against the liner 12, and the plurality of fiber-reinforced resins R adhere to each other. In addition, the terminal end portion Re is held inside the annular holding portion 54. In this state, the terminal end portion Re is positioned and held at, for example, the outer peripheral portion 62 in the vicinity of the substantially center along the axial direction of the liner 12.

Figure 5:
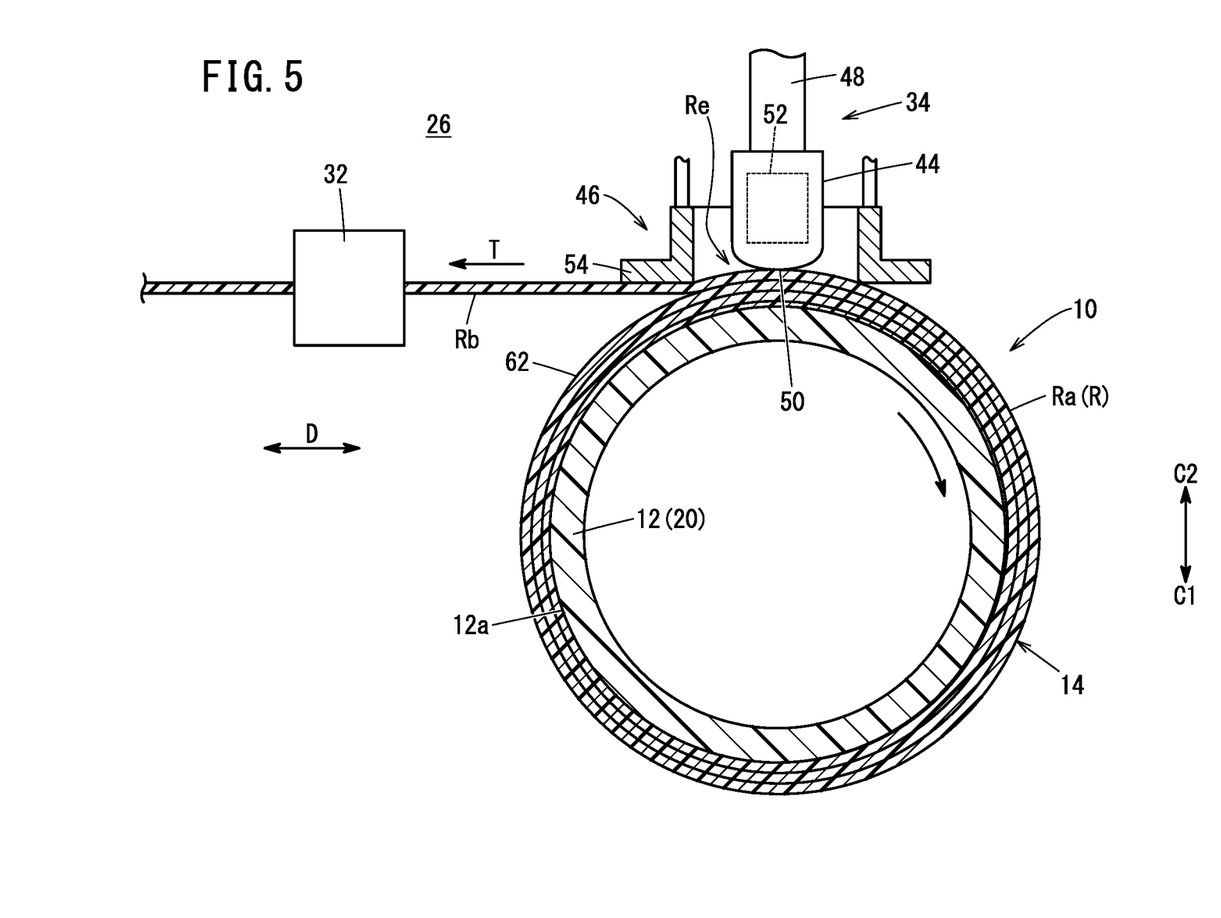
FIG. 5 is a cross-sectional view showing a thermocompression-bonding step in a manufacturing process of the high-pressure tank.

Thereafter, the pressure bonding member 44 moves toward the liner 12, and as shown in FIGS. 5 and 6, the distal end of the pressure bonding member 44 is made substantially orthogonal to the terminal end portion Re of the fiber-reinforced resin R positioned on the inner side in the radial direction of the holding portion 54. Then, as shown in FIG. 7, the pressing surface 50 of the pressure bonding member 44 comes into contact with the terminal end portion Re substantially orthogonally to the fiber direction (the arrow D direction) of the terminal end portion Re. As a result, the resin base material impregnated in the terminal end portion Re is melted by heat transmitted from the pressing surface 50 of the pressure bonding member 44. The melted resin base material flows along the fiber direction of the fiber bundle Ra.

After the pressing and the heating of the terminal end portion Re by the pressure bonding member 44 are completed, the resin base material of the terminal end portion Re is melted and is then gradually cured by a cross-linking reaction. The terminal end portion Re is fixed to a desired portion of the outer peripheral portion 62 of the fiber bundle Ra. At this time, the terminal end portion Re is fixed in a state of being applied with the predetermined tension T along the fiber direction (the arrow D direction) by the feeding mechanism 32.

Figure 8:
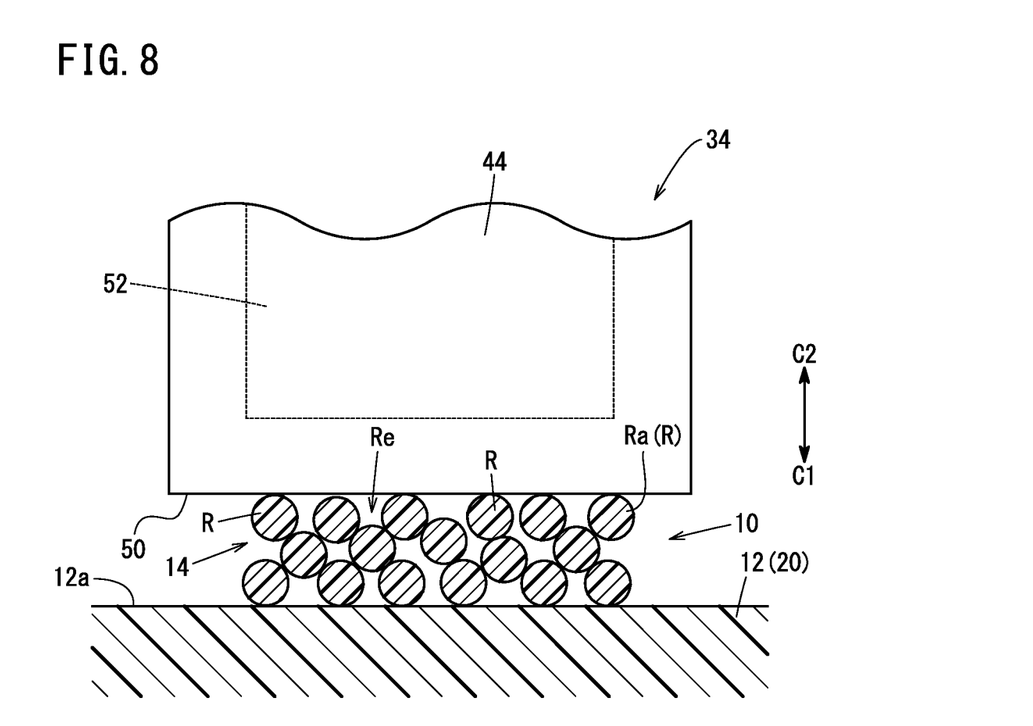
FIG. 8 is a cross-sectional view taken along line VIII-VIII of FIG. 6.

Then, after the fixing of the terminal end portion Re to the outer peripheral portion 62 of the fiber bundle Ra is completed, the cylinder device 48 is driven to move the pressure bonding member 44 in a direction away from the liner 12. As a result, the pressure bonding member 44 separates from the terminal end portion Re. Next, the pressing member 46 is moved in a direction away from the liner 12. As a result, the pressing member 46 separates from the vicinity of the terminal end portion Re, and the holding state of the vicinity of the terminal end portion Re is released. At this time, as shown in FIGS. 5, 6, and 8, even if the pressing member 46 is separated, the terminal end portion Re does not float radially outward from the outer peripheral portion 62.

Further, after the pressing surface 50 of the pressure bonding member 44 is brought into contact with the terminal end portion Re, the pressure bonding member 44 may be swung along the fiber direction (the arrow D direction) with a contact surface between the pressing surface 50 and the terminal end portion Re as a fulcrum, as shown by two dot chain lines in FIG. 6. In this case, as shown in FIG. 6, the terminal end portion Re comes into contact with the pressure bonding member 44 over a predetermined range E that is along the fiber direction (the arrow D direction) from the portion of the terminal end portion Re with which the distal end of the pressure bonding member 44 comes into contact substantially orthogonally. As a result, the pressing surface 50 of the pressure bonding member 44 presses and heats the predetermined range E of the terminal end portion Re. Therefore, the terminal end portion Re can be fixed to the outer peripheral portion 62 of the fiber bundle Ra over the predetermined range E that is wider than in a case where the pressure bonding member 44 is brought into contact with the terminal end portion Re substantially orthogonally to the terminal end portion Re.

In the pressure-bonding step described above, the terminal end portion Re of the fiber bundle Ra is pressed toward the liner 12 by the pressing member 46 as shown in FIGS. 5 and 6. The terminal end portion Re is thermocompression-bonded in a state of being pressed toward the liner 12 by the pressure bonding member 44. Therefore, the fixing portion (terminal end portion Re) of the fiber reinforced resin R does not float outward in the radial direction of the liner 12, and unevenness is not formed.

Further, the pressing surface 50 of the pressure bonding member 44 is formed in an arc shape in cross section. Therefore, as shown in FIG. 7, when the terminal end portion Re of the fiber bundle Ra is thermocompression-bonded to the outer peripheral portion 62 of the fiber bundle Ra that has been already wound around the liner 12, each fiber-reinforced resin R in the terminal end portion Re is prevented from spreading in the direction orthogonal to the fiber direction (the arrow D direction). Further, when the fiber bundle Ra (fiber-reinforced resin R) is heated at the distal end of the pressure bonding member 44, the resin base material impregnated in the fiber bundle Ra is melted and flows along the fiber direction. Therefore, the terminal end portion Re is thermocompression-bonded to the outer peripheral portion 62 of the fiber bundle Ra in a state where the fiber-reinforced resins R in the terminal end portion Re are close to each other.

Next, a portion (the surplus portion Rb) closer to the feeding mechanism 32 than the terminal end portion Re of the fiber bundle Ra fixed in the pressure-bonding step is cut (cutting step).

In this cutting step, as shown in FIG. 9, after the tension T of the fiber bundle Ra is relaxed by the feeding mechanism 32, the liner 12 is rotated counterclockwise. Then, between the terminal end portion Re and the feeding mechanism 32, a pedestal 64 is inserted between the surplus portion Rb and the liner 12. The flat surface of the pedestal 64 is disposed in contact with the lower surface of the surplus portion Rb.

Next, based on the fiber direction (the arrow D direction) of the terminal end portion Re detected by the detecting mechanism 36, the cutting tool 60 rotates substantially orthogonally to the fiber direction. The cutting tool 60 is disposed at a position above the pedestal 64 with the surplus portion Rb interposed therebetween, and thereafter, the cutting tool 60 moves toward the surplus portion Rb and the pedestal 64 (in the cutting direction). Then, the surplus portion Rb of the fiber bundle Ra is cut in a direction substantially orthogonal to the fiber direction of the fiber bundle Ra by the cutting tool 60, at a boundary position between the terminal end portion Re and the surplus portion Rb extending a predetermined distance from the terminal end portion Re toward the feeding mechanism 32. Accordingly, the surplus portion Rb of the fiber bundle Ra is cut in a state where the terminal end portion Re is fixed to the outer peripheral portion 62 of the fiber bundle Ra. The terminal end portion Re is fixed to the outer peripheral portion 62 of the fiber bundle Ra wound around the liner 12 in a state where the tension T is maintained in the fiber bundle Ra.

Finally, after the surplus portion Rb of the fiber-reinforced resin R is cut in the cutting step, the fiber-reinforced resin R wound around the outer surface 12a of the liner 12 is thermally cured to form the reinforcing layer 14 (thermal curing step).

In this thermal curing step, the liner 12 is removed together with the shaft 28 from the rotating mechanism 30 in the manufacturing apparatus 26. Thereafter, the liner 12 around which the fiber bundle Ra is wound is carried into a heating furnace (not shown). The liner 12 is heated to a predetermined temperature in the heating furnace to cure the fiber bundle Ra (fiber-reinforced resin R). As a result, the reinforcing layer 14 obtained by laminating the fiber bundle Ra on the outer surface 12a of the liner 12 is formed with a smooth surface including the terminal end portion Re. Then, the manufacture of the high-pressure tank 10 in which the outer peripheral portion of the liner 12 is covered with the reinforcing layer 14 is completed.

In the method for manufacturing the high-pressure tank 10 described above, the tension T is applied to the fiber bundle Ra wound around the liner 12 in the filament winding step. In this state, in the pressure-bonding step, the terminal end portion Re of the fiber bundle Ra is thermocompression-bonded to the outer peripheral portion 62 of the fiber bundle Ra that has been already wound around the outer surface 12a of the liner 12. Therefore, in the high-pressure tank 10, the outer peripheral surface of the reinforcing layer 14 obtained by winding the fiber bundle Ra is not formed as an uneven surface but as a smooth surface.

In addition, the terminal end portion Re can be fixed to the outer peripheral portion 62 of the fiber bundle Ra in a state where the tension T is applied to the terminal end portion Re. Therefore, the strength of the reinforcing layer 14 at the terminal end portion Re and in the vicinity thereof can be ensured to be equal to the strength of the portion of the reinforcing layer 14 other than the terminal end portion Re. As a result, the strength of the reinforcing layer 14 can be maintained substantially constant over the entire region of the reinforcing layer 14 wound around the liner 12.

As described above, in the present embodiment, in the filament winding step (winding step), the fiber bundle Ra obtained by bundling the fiber reinforced resins R impregnated with the thermosetting resin base material is wound around the outer surface 12a of the hollow liner 12 in a state of being applied with the tension T. Thereafter, in the thermal curing step, the resin base material contained in the fiber bundle Ra wound around the outer surface 12a of the liner 12 is thermally cured to form the reinforcing layer 14.

In the filament winding step, the terminal end portion Re, which is the winding end of the fiber bundle Ra, is thermocompression-bonded to the outer peripheral portion 62 of the fiber bundle Ra that has been already wound around the outer surface 12a of the liner 12 in the pressure-bonding step. Therefore, the outer peripheral surface of the reinforcing layer 14 obtained by winding the fiber bundle Ra is not formed in an uneven shape.

In the filament winding step, after the terminal end portion Re applied with the tension T is fixed to the outer peripheral portion 62 of the fiber bundle Ra that has been already wound around the liner 12 in the pressure-bonding step, the fiber bundle Ra is cut in the cutting step. Therefore, the fiber bundle Ra can be wound around the liner 12 and reliably fixed in a state where the tension T is applied to the entire region from the winding start of the fiber bundle Ra around the liner 12 to the terminal end portion Re serving as the winding end.

As a result, the outer peripheral surface of the high-pressure tank 10 can be formed to be smooth to improve the quality. Further, the strength of the reinforcing layer 14 is maintained substantially constant over the entire region of the high-pressure tank 10. Therefore, even when the liner 12 expands or contracts in accordance with the supply or discharge of the high-pressure gas in the high-pressure tank 10, it is possible to suppress peeling of the fiber bundle Ra (fiber-reinforced resin R) from the terminal end portion Re.

In the pressure-bonding step, the terminal end portion Re of the fiber bundle Ra is pressed inward in the radial direction of the liner 12 by the heated pressure bonding member 44. As a result, the fiber bundle Ra that has been already wound around the outer surface 12a of the liner 12 and the terminal end portion Re are thermocompression-bonded to each other. Therefore, the terminal end portion Re can be effectively thermocompression-bonded and fixed to the outer peripheral portion 62 of the fiber bundle Ra by the pressure bonding member 44.

The filament winding step includes a detection step of detecting the fiber direction (the arrow D direction) of each fiber-reinforced resin R at the terminal end portion Re of the fiber bundle Ra. Based on the fiber direction detected in the detection step, the pressing direction in which the fiber bundle Ra is pressed by the pressing surface 50 of the pressure bonding member 44 in the pressure-bonding step and the cutting direction in which the fiber bundle Ra is cut by the cutting tool 60 in the cutting step are changed. As a result, in the pressure-bonding step, the pressure bonding member 44 is brought into contact with the terminal end portion Re substantially orthogonally to the terminal end portion Re in accordance with the fiber direction (the arrow D direction) of the terminal end portion Re, whereby the terminal end portion Re can be reliably thermocompression-bonded. In addition, in the cutting step, the cutting tool 60 is disposed orthogonal to the fiber direction of the terminal end portion Re, whereby the surplus portion Rb of the fiber bundle Ra close to the terminal end portion Re can be reliably cut in the direction orthogonal to the fiber direction.

The pressing surface 50 having an arc-shaped cross section is provided at the distal end of the pressure bonding member 44, and the terminal end portion Re is pressed in a state where the pressing surface 50 is arranged along the fiber direction (the arrow D direction) of the fiber bundle Ra. Further, the pressing surface 50 is brought into contact with the terminal end portion Re, and the pressure bonding member 44 is swung along the fiber direction to press the terminal end portion Re. As a result, spreading of the terminal end portion Re in a direction substantially orthogonal to the fiber direction of each fiber-reinforced resin R is suppressed. Further, in the terminal end portion Re, the resin base material impregnated in the fiber bundle Ra is melted and flows along the fiber direction (the arrow D direction). Therefore, the occurrence of separation between the fiber-reinforced resins R in the terminal end portion Re is suppressed, and the terminal end portion Re can be reliably thermocompression-bonded to the outer peripheral portion 62 of the fiber bundle Ra.

On the other hand, for example, in a case where the fiber bundle Ra is thermocompression-bonded by the pressure bonding member 44 having a flat distal end, the fiber bundle Ra spreads in a direction substantially orthogonal to the fiber direction (the arrow D direction), and a gap is generated between the fiber-reinforced resins R. Further, the resin base material impregnated in the fiber bundle Ra is melted and flows in a direction orthogonal to the fiber direction. Accordingly, the fiber-reinforced resins R are easily separated from each other in the portion subjected to the thermocompression-bonding. As a result, the strength of the reinforcing layer 14 in the vicinity of the terminal end portion Re is reduced.

In the pressure-bonding step, the vicinity of the terminal end portion Re is pressed toward the liner 12 by the pressing member 46 of the pressure bonding mechanism 34. Accordingly, the vicinity of the terminal end portion Re can be reliably brought into close contact with the outer peripheral portion 62 by the pressing member 46. Further, the fiber-reinforced resins R in the vicinity of the terminal end portion Re can be brought close to each other. Therefore, when the terminal end portion Re is thermocompression-bonded by the pressure bonding member 44, the occurrence of separation between the fiber-reinforced resins R in the terminal end portion Re is suppressed, and the terminal end portion Re can be reliably thermocompression-bonded to the outer peripheral portion 62 of the fiber bundle Ra.

The present invention is not limited to the above-described embodiment, and various configurations can be adopted therein without departing from the essence and gist of the present invention.

What is claimed is:

1. A method for manufacturing a high-pressure tank including a reinforcing layer on an outer surface of a liner having a hollow shape, the method comprising:
    winding a fiber bundle impregnated with a thermosetting resin around the outer surface of the liner in a state where tension is applied to the fiber bundle; and
    forming the reinforcing layer by thermally curing the thermosetting resin contained in the fiber bundle wound around the outer surface, wherein
    the winding of the fiber bundle includes:
    pressure-bonding a terminal end portion serving as a winding end of the fiber bundle, to an outer peripheral portion of the fiber bundle wound around the liner for thermocompression-bonding and curing; and
    cutting, with a cutting tool, a surplus portion of the fiber bundle that is close to the terminal end portion and is not wound around the liner, and
    wherein the pressure-bonding includes:
    moving a pressing member having an annular holding portion from an outside of the liner toward the terminal end portion, making the pressing member in contact with the terminal end portion, and pressing the terminal end portion toward the liner by the pressing member; and
    after the pressing the terminal end portion toward the liner, moving a pressure bonding member from the outside of the liner toward the terminal end portion, making a pressing surface of the pressure bonding member in contact with the terminal end portion inside the holding portion, heating the terminal portion by the pressure bonding member, and thermocompression-bonding the terminal end portion and the outer peripheral portion of the fiber bundle to each other, and
    wherein the cutting includes
        inserting a wedge-shaped pedestal between the surplus portion and the liner, and
        cutting, subsequent to the pressure bonding, the surplus portion against the wedge-shaped pedestal.

2. The method according to claim 1, wherein
in the pressure-bonding, the terminal end portion is thermocompression-bonded in a state where the tension is applied to the fiber bundle.

3. The method according to claim 1, wherein
the winding of the fiber bundle includes detecting a fiber direction of the fiber bundle at the terminal end portion, and
at least one of an orientation of the pressing surface of the pressure bonding member or a cutting direction of the fiber bundle is changed according to the fiber direction thus detected.

4. The method according to claim 3, wherein
a cross section of the pressing surface is formed in an arc shape that is convex toward the fiber bundle, and the pressing surface presses the fiber bundle in a state where the pressing surface lies along the fiber direction of the fiber bundle.

5. The method according to claim 4, wherein
the pressing member presses both sides of the pressing surface that lies along the fiber direction.

\* \* \* \* \*